(12) United States Patent
Balakrishnan et al.

(10) Patent No.: US 7,779,230 B2
(45) Date of Patent: Aug. 17, 2010

(54) DATA FLOW EXECUTION OF METHODS IN SEQUENTIAL PROGRAMS

(75) Inventors: Saisanthosh Balakrishnan, Madison, WI (US); Gurindar Singh Sohi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 951 days.

(21) Appl. No.: 11/550,687

(22) Filed: Oct. 18, 2006

(65) Prior Publication Data

US 2008/0098403 A1 Apr. 24, 2008

(51) Int. Cl.
G06F 9/38 (2006.01)
(52) U.S. Cl. ............................. 712/31; 712/28; 712/30; 717/131; 719/312
(58) Field of Classification Search .................. 712/28, 712/30, 31; 717/131; 718/100, 102; 719/312
See application file for complete search history.

(56) References Cited

U.S. PATENT DOCUMENTS 5,742,824 A * 4/1998 Kosaka ........................ 718/106

2009/0125907 A1 * 5/2009 Wen et al. ................... 718/101

OTHER PUBLICATIONS

Manoj Franklin, The Multiscalar Architecture, Phd. Dissertation, Univ. of Wisconsin at Madison, 1993.*
Craig Zilles, Master/Slave Speculative Parallelization and Approximate Code, Phd. Dissertation, Univ. of Wisconsin at Madison, 2002.*
Hammond et al., Programming with Transactional Coherence and Consistency, ACM SIGOPS Operating Systems Review, vol. 38, iss. 5, Dec. 2004, pp. 1-13.*
Quinones et al., Mitosis Compiler: An Infrastructure for Speculative Threading Based on Pre-Computation Slices, Proceedings of the 2005 ACM SIGPLAN Conference on Programming Language Design and Implementation, pp. 269-279.*
Steffan et al., The Potential for Using Thread-Level Data Speculation to Facilitate Automatic Parallelization, Proceedings of the 4th International Symposium on High-Performance Computer Architecture, Feb. 1-4, 1998, pp. 2-13.*
Warg et al., Reducing Misspeculation Overhead for Module-Level Speculative Execution, Proceedings of the $2^{nd}$ Conference on Computing Frontiers, ACM, 2005, pp. 289-298.*

* cited by examiner

*Primary Examiner*—William M Treat
(74) *Attorney, Agent, or Firm*—Boyle Fredrickson, S.C.

(57) ABSTRACT

Distant parallelization of sequential programs is obtained by making parallelization decisions at the boundaries between program methods (e.g., functions and sub-routines). Experimentation suggests that such a partitioning allows for large-scale parallelization without data flow conflicts.

21 Claims, 5 Drawing Sheets

DATA FLOW EXECUTION OF METHODS IN SEQUENTIAL PROGRAMS

STATEMENT REGARDING FEDERALLY SPONSORED RESEARCH OR DEVELOPMENT

This invention was made with United States government support awarded by the following agencies:
NSF Grants: 0071924 and 0311572
The United States government has certain rights in this invention.

CROSS-REFERENCE TO RELATED APPLICATIONS

- - -

BACKGROUND OF THE INVENTION

The present invention relates to computer systems with multiple processors and to multicore processors, and in particular to a method and apparatus of parallelizing programs for execution on such computer systems.

Multicore microprocessors, incorporating multiple processor units, are being used to increase the processing speed of computer systems by allowing parallel execution of a program on multiple processor units. This is in contrast to techniques that increase the processing speed of computer systems by increasing the internal clock rate of an individual processing unit, or techniques that increase the exploitation of instruction-level parallelism within a processing unit.

While it is possible to write a program that is specially designed for parallel execution on a multicore processor, it is clearly desirable to provide a method of parallelizing standard sequential programs. Such a parallelizing method would simplify programming, allow the use of standard programming tools, and permit current programs to execute efficiently on multicore systems.

It is known to parallelize standard sequential programs by exploiting naturally occurring parallel structure that can be found in small groups of instructions. Increased parallelization may be obtained through speculative techniques that execute small groups of instructions that are logically sequential but that may, in practice, be executed in parallel without data dependency or control dependency conflicts. Generally, data dependencies are violated when one concurrent thread executes based on an assumption about data values that are changed by another concurrently executing thread earlier in the control flow. Control dependencies are violated when one concurrent thread executes based on an assumption about the control flow, for example the resolution of a branch statement that is changed by another concurrently executing thread earlier in the control flow.

These problems of data and/or control dependencies substantially limit the number of instructions that can be parallelized by these techniques. As the number of concurrently executing threads increases in an attempt to achieve "distant" parallelism, violations of data and/or control dependencies become more common. Violations of data and/or control dependencies require "squashing" of the thread in violation, a process that can erase gains in execution speed from the parallelization.

BRIEF SUMMARY OF THE INVENTION

The present inventors have recognized that speculative parallelization of significantly larger groups of instructions may be obtained by exploiting the construction of most sequential programs as an assemblage of "methods" (e.g. subroutines, functions and procedures). These methods partition the sequential program into natural groups of instructions that often share well-defined and localized initialization values (referred to as parameters) and return values. This abstraction eliminates the data dependencies satisfied within the method and hence, simplifies the avoidance and detection of data dependency violations. Further, methods provide groups of instructions that normally execute as a single element with respect to control flow, simplifying the avoidance and detection of control dependency violations. Methods can be detected in object code, allowing the present invention to be applied to sequential programs, after the fact, without the involvement of the programmer.

Specifically, the present invention provides a means of parallelizing the execution of a computer program. The invention executes the program on a first processor and at a trigger point before a point of calling of a method of the program, executes the method on a second processor using assumed values of a read set of data read by the method in the method's execution. When the method is to be called on the first processor, if there has been no writing to the read set since the trigger point, execution of the method on the first processor is skipped and the write set of data from the second processor is used. On the other hand, if there has been a writing to the read set since the trigger point, the method is simply executed on the first processor.

Thus it is a feature of at least one embodiment of the invention to follow the natural structure of methods in sequential programs to provide for a "distant" parallelization of the sequential program.

A method may be a portion of the program executing using local variables whose values are retained only during execution of the method and that may also use the global program state which can be accessed by any part of the program.

It is thus a feature of at least one embodiment of the invention to take advantage of the closed structure of some methods in which the method provides variables having only a local scope, such as naturally simplifies some data dependency issues in speculative execution.

The method may be a programmer-defined division of the sequential program having a distinctive single entry and exit point to be called from multiple locations of the sequential program.

It is thus another feature of at least one embodiment of the invention to make use of the method's natural modularity, such as may simplify control and data dependency issues in speculative execution.

The methods may include functions from system libraries, application libraries, and class objects.

It is thus another feature of at least one embodiment of the invention to provide a system that works with common methods used in many applications.

The write set executed on the second processor may also be adopted if there has been a writing to the read set but no change in values of the read set.

It is thus another feature of at least one embodiment of the invention to permit the acceptance of speculative parallelization even in cases where there has been modification to the read set if that modification would not have affected the execution of the method.

The method may include the steps of repeating the described process for an arbitrary number of additional processors in the role of the second processor.

It is thus another feature of at least one embodiment of the invention to provide a system that may be readily scaled to multicore processor systems having more than two cores.

The detection of a writing to the read set may consider a writing by the first processor or others of a set of processors.

Thus, it is a feature of at least one embodiment of the invention to provide a system that may be readily scaled for multicore processor systems having more than two cores where more than two processor cores may be speculatively executing in parallel.

The trigger point in the program may be selected so that the method is completely executed by the second processor before the first processor completes execution of the method.

It is thus a feature of at least one embodiment of the invention to allow triggering of the speculative execution of a method relatively close to the call point of the method, reducing the chance for data and control violations. So long as the method is fully executed before the first processor would have completed the method, the benefits of parallelization are obtained.

The trigger point may be detected by monitoring a program counter of the first processor against a stored program counter value or by placing a triggering instruction in the program at the trigger point or by monitoring an address of memory access by the first processor.

Thus, it is a feature of at least one embodiment of the invention to provide a flexible set of techniques for identifying a trigger point.

The method may include the step of measuring the performance of the program and changing the trigger point in response to that measurement, either by removing selected trigger points or moving the trigger points in the program.

It is thus a feature of at least one embodiment of the invention to provide for a dynamic system that may improve its performance by empirical measurement.

The method may include the steps of identifying the locations of methods in the program and executing the program while monitoring memory accesses during the method execution to determine the read set for each method.

It is thus a feature of at least one embodiment of the invention to provide a technique for determining the read set that does not require a syntactic understanding of the method and its memory accesses.

The methods may be identified by call instructions that are used to call a given method located in the program.

It is thus a feature of at least one embodiment of the invention to take advantage of the natural delimiters of methods, without imposing special requirements at the time of programming.

The trigger points may be determined by identifying when the values of the read set are available.

Thus, it is a feature of at least one embodiment of the invention to provide a simple mechanism for determining trigger points.

The processors may further execute instruction level speculation.

It is thus a feature of at least one embodiment of the invention to provide a method level parallelization technique that may be used in conjunction with instruction level parallelization and other speculative execution techniques for increased speed of execution.

These particular features and advantages may apply to only some embodiments falling within the claims, and thus do not define the scope of the invention.

DETAILED DESCRIPTION OF THE PREFERRED EMBODIMENT

Figure 1:
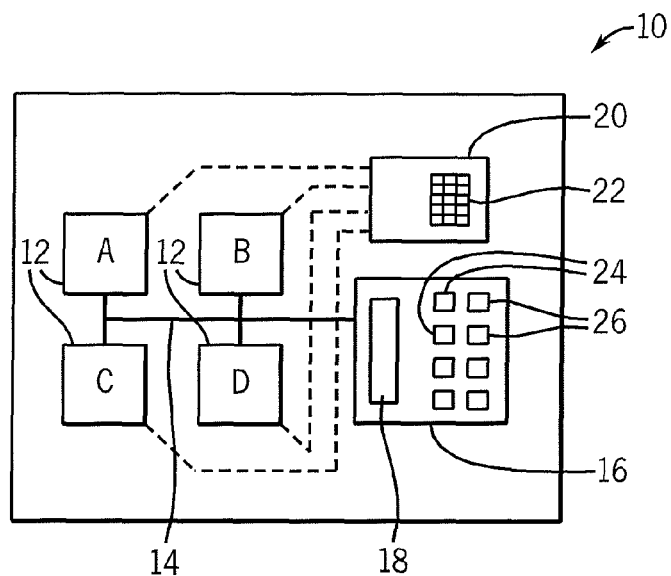
FIG. 1 is a block diagram of a multicore processor showing multiple processor units communicating with a common memory under the control of parallelization circuitry of the present invention.

Referring now to FIG. 1, an example computer system 10 suitable for use with the present invention provides a multi-core architecture including a number of processor units 12 labeled A through D. Each processing unit will typically provide a full arithmetic logic unit (ALU) and local cache structures (L1), though different processing cores may or may not have different resource capabilities.

The processor units 12 communicate on a common bus 14 with memory 16, for example a second level (L2) cache and/or off-board random access memory. The memory 16 will typically hold at least a portion of a sequential execution program 18, as well as provide storage space for an execution buffer 24 and handlers 26, as will be described.

The computer system 10 may preferably include parallelization circuitry 20 providing coordination of the execution of the sequential program 18 on the processor units 12. This parallelization circuitry 20 provides one or more dedicated registers 22 for holding trigger points and calling points and other data as will be described below.

Figure 2:
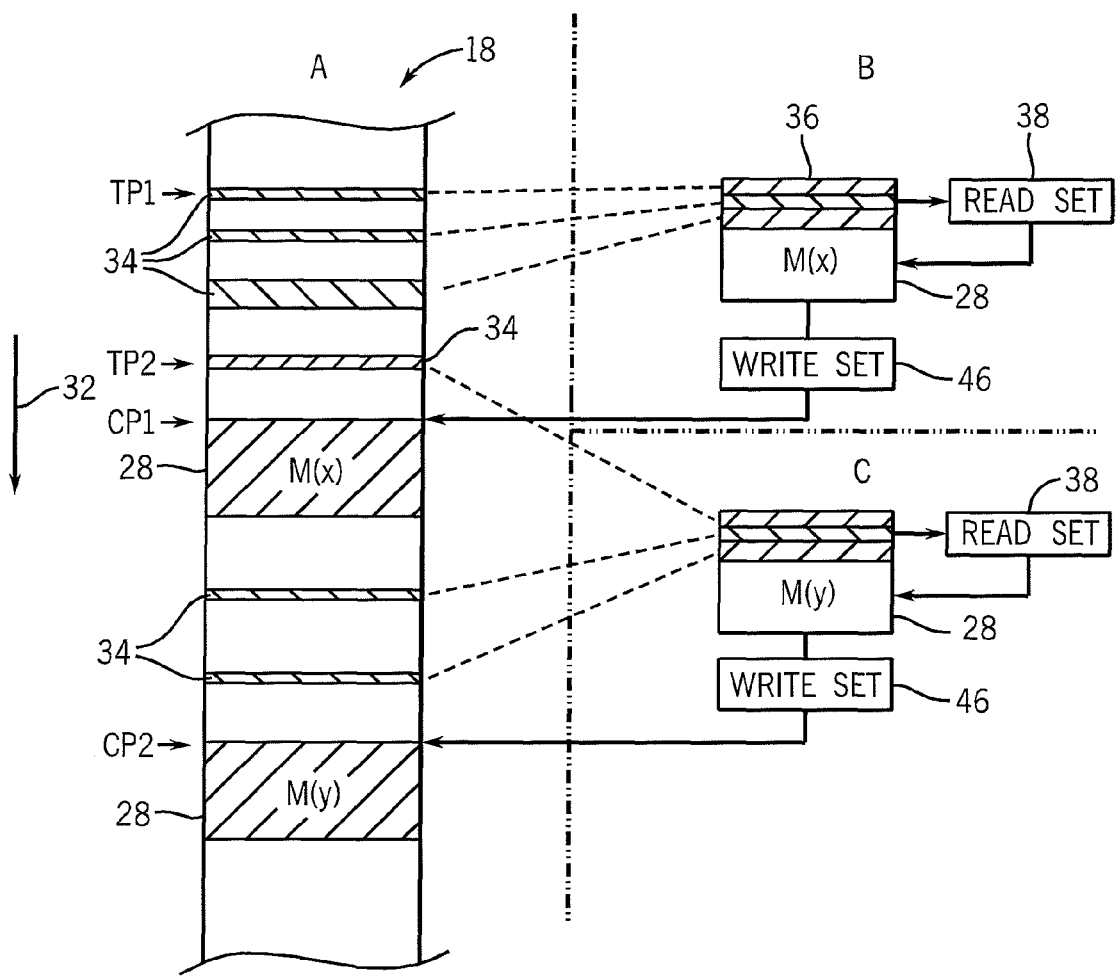
FIG. 2 is a graphical representation of a sequential program having two methods, M(x) and M(y), showing control flow during the parallelization process of the present invention.

Referring now to FIG. 2, the sequential program 18 may include a first and second method 28 being each, for example C functions, that accept initialization values of X and Y, respectively, and produce return values M(X) and M(Y) at the conclusion of their execution. Typically but not necessarily, each of the methods 28 will execute using locally scoped internal variables and typically, but not necessarily, will not modify global variables during execution. In such cases, the initialization values and return values are typically passed through a stack structure (not shown) using stack push and pop instructions well understood to those of skill in the art. More generally, the methods 28 will include logical program divisions commonly termed sub-routines, functions, or procedures. Methods may share one or more of the qualities of being callable from many locations within a program, being self-contained in execution, and having local scoping of variables.

Methods 28 are placed in a control flow order 32 in the sequential program 18 reflecting their normal execution order. The control flow order 32 may be, and typically is, different from the order in which the methods 28 occur in the program 18 as stored in memory 16, reflecting the fact that the methods 28 may be invoked from multiple call points in the program 18. In this example, method M(X) is invoked at calling point CP1 and method M(Y) is invoked at calling point CP2. Generally, the methods themselves need not follow the calling points in the actual program, but are shown following the calling points according to the control flow order 32 of the sequential program 18.

The instructions before each call point CP1 and CP2 include preparatory instructions 34 that generate values that will be used by the respective methods 28 and then passed to the methods 28 when they are called. These values and other global program values used by the methods 28 will be the "read set" 38 for the methods 28. The global program values that are part of read set 38 of a method 28 may be determined by inspection of the instructions of the method 28 or by monitoring execution of the method 28 as will be described and will be assigned a storage structure (of the same name) in the execution buffer 24 generally recording the memory locations accessed by the method 28 and the assumed data values for those memory locations.

In the present invention, trigger points, TP1 and TP2, will be identified in the program 18 before the calling points CP1 and CP2 for each method 28 so that some preparatory instructions 34 are located between each respective trigger point TP1 and TP2 and its related calling point CP1 and CP2. Each of these "embraced" preparatory instructions 34 will be incorporated into a handler 36. The preparatory instructions 34 will typically be a small percentage of the total instructions between a given trigger point and its calling point so that the preparatory instructions 34, when executed in isolation in a handler 36 as begun at the trigger point, may, but need not, be completed well before a processor executing all the instructions between the trigger point and the calling point arrives at the calling point.

Figure 3:
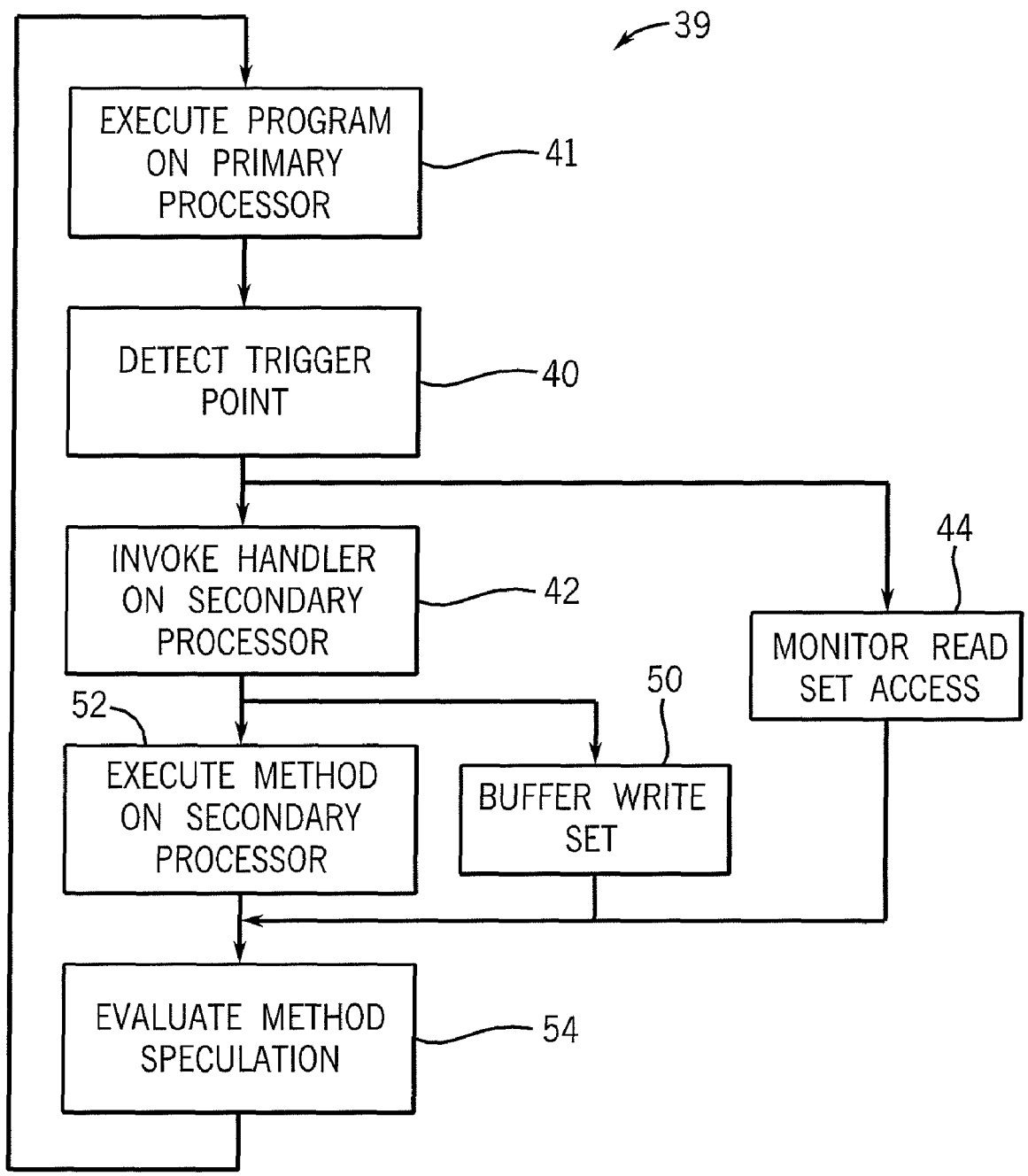
FIG. 3 is a flow chart showing the steps of speculative parallelization of FIG. 2.

Referring now to FIGS. 1, 2 and 3, during speculative parallelization of the program 18, the parallelization circuitry 20 executing internal firmware 39, selects a first one of the processor units 12, for example processor A, to begin execution of the program 18. This is indicated at process block 41 of FIG. 3 and in the headings of FIG. 2.

During this execution, the firmware 39 monitors trigger points, for example stored in register 22 of parallelization circuitry 20, and when a trigger point occurs, as detected by process block 40, a handler 36 associated with that trigger point is invoked per process block 42. At this time, the firmware 39 also begins monitoring any memory accesses to the memory locations stored in read set 38 by any other processor unit 12, as indicated by process block 44.

Referring to FIGS. 2 and 3, the handler 36 will be executed on a second processor unit 12 (any of B, C or D in this example) based on a determination by the firmware 39 that the particular processor unit 12 is available. The execution of the handler 36 executes the preparatory instructions 34 reading any necessary values from registers, the stack, or global memory (the heap) and recording the values used and/or generated in the read set 38.

As indicated by process block 52, when the handler 36 is complete, the firmware begins execution of the associated method 28 also on the second processor unit 12. During the execution of the method, data is read from the read set 38 and written to a write set 46 also in the execution buffer 24 and is not yet written to their normal locations in memory 16, as indicated by process block 50. The write set 46 may thus store the data values generated by the method 28 and the memory addresses to which they were intended to be written. Any trigger points reached during this execution are also stored in the execution buffer, and do not invoke any handlers yet.

Because, as noted above, the preparatory instructions 34 of the handler 36 will be a small percentage of the instructions between the trigger point and the calling point, the execution of the method 28 and the generation of the write set 46 on the second processor unit 12 will typically be concluded before the first processor unit 12 arrives at the calling point for the method 28. Nevertheless, the method 28 need not be completed when the first processor arrives at the calling point. If the method 28 is in progress on the second processor unit 12, the first processor unit 12 can choose to wait until the execution of the method 28 has finished on the second processor unit 12. When the second processor unit 12 is finished, the first processor unit 12 may then use the results from the second processor unit 12, rather than execute the method 28 on the first processor unit 28. This will frequently be preferred, if the execution of the method 28 is near completion on the second processor unit 12 when the first processor unit 12 arrives at the calling point, thus it is beneficial to wait for the method's completion rather than re-execute the method 28 completely.

Referring still to FIGS. 2 and 3, when the first processor unit 12 arrives at the calling point for the method 28, detected again by parallelization circuitry 20 holding the calling points in register 22, the firmware 39 proceeds to process block 54 to evaluate the success of the speculative parallel execution of the method 28 on the second processor unit 12.

Figures 4, 6:
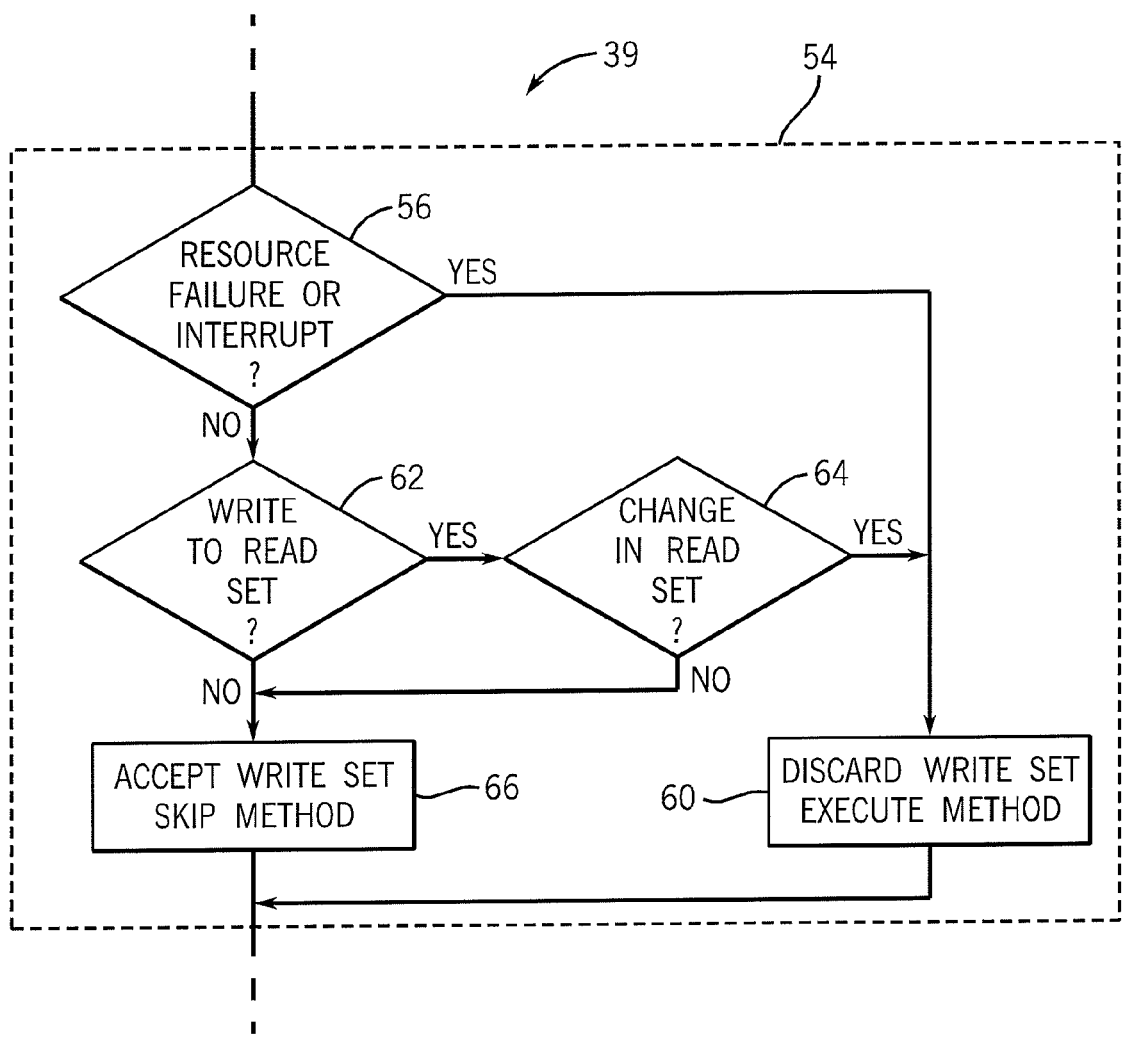
FIG. 4 is a flow chart showing the steps of the process of evaluating the speculative execution of FIG. 3.
FIG. 6 is a table representing values used by the present invention as collected per FIG. 5.

Referring now to FIG. 4, this evaluation of the speculation determines initially, as indicated by decision block 56, whether there has been a resource failure during the execution of the handler 36 and method 28 on the second processor unit 12. Such a resource failure, for example might be exhaustion of execution buffer 24 or other common resource failures as will be understood to those of ordinary skill in the art. In addition, or alternatively, the speculation may be terminated upon an interrupt or the lack of a second processor.

If such a resource failure occurred, the program proceeds to process block 60 and the write set 46 is discarded, and the firmware 39 causes the first processor unit 12 to continue execution to execute the method 28 in the normal course of its control flow order 32.

If, at decision block 56, there has been no resource failure, then the firmware 39 proceeds to decision block 62 where it is determined whether there has been any write by the first processor unit 12 or any other processor units 12 to memory 16 at the addresses stored in the read set 38. Such a writing may indicate that the data used in the execution of the method 28 on the second processor is invalid, which in turn may indicate a data dependency violation.

If such a write has occurred, such as may, for example, be detected by well known techniques, for example those used for cache invalidation protocols, the firmware 39 proceeds to decision block 64, and checks to see whether the detected writes actually changed the value in memory 16 of any of the addresses in the read set 38 to be different from the value stored in the read set 38 for the corresponding address.

If the answer is that the writing changes a read set value, the program proceeds again to process block 60 as has been described.

If however, the value in the read set 38 has not been changed per decision block 64 or there has been no writing to any of the addresses recorded in the read set 38, then the program proceeds to process block 66 where the firmware 39 causes the write set 46 to be adopted by the first processor unit 12 (that is written to memory 16) and for the first processor unit 12 to skip the execution of method 28. Any trigger points buffered during the execution are raised and the executions of other methods begin with the respective handlers.

This process of allocating methods 28 to other processor units 12 may be repeated for multiple processors, with different processor units 12 being used in place of the second processor unit 12 above and multiple second processors executing concurrently, for example, with the next method M(Y), beginning execution of its handler at TP2 on a third processor unit 12 (e.g. C) concurrently with the execution of method M(X) on (B) and the execution of the program 18 on (A).

Figure 5:
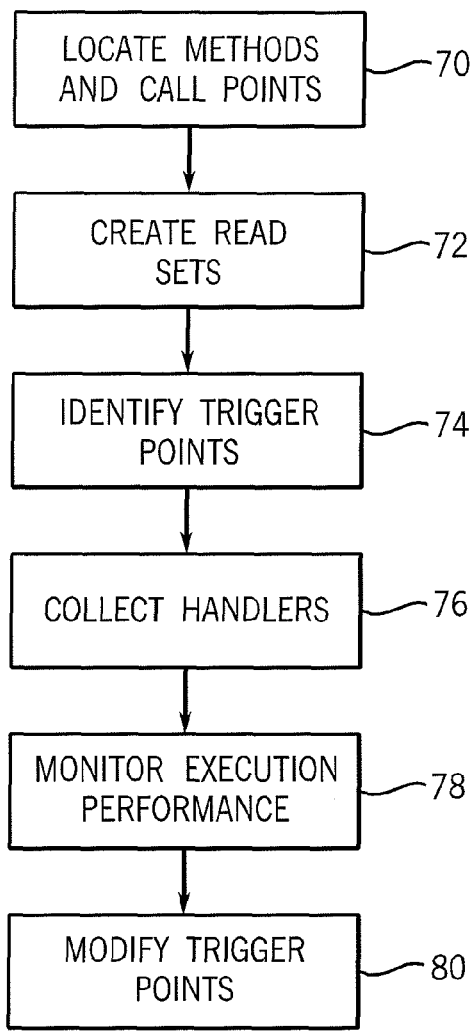
FIG. 5 is a flow chart showing the steps of preparing the standard parallel program for parallelization by identifying methods, trigger points, call points, handlers, and read sets.

Referring now to FIGS. 5 and 6, identification of the methods, their trigger points and calling points, the read sets and the handlers 36 may be done before execution of the program 18 and refined as the program 18 executes. Generally this identification process does not require input from the programmer of the program 18 but may be performed by inspection of the object code of the program 18 and its execution.

At a first step of this process, indicated by process block 70, the methods 28 and call points in the program 18 are identified by one of several techniques, including most simply reviewing the object code of the program 18 for call instructions. The program counter used in the call instruction indicates the beginning of a method. Once the methods 28 are detected, the call points may be easily identified by looking for calls to the addresses of the identified methods 28.

At process block 72, the read sets 38 are then identified by looking at the sections of the program 18 identified to the methods 28, for example simply by tallying all of the reads that occur in that program section or by collecting the addresses from which data is obtained that will be passed on the stack or by means of registers, or register windows or other similar data structures or special memory address spaces. The read set 38 may be over-inclusive to some extent without significantly affecting the invention. Alternatively, the read set 38 may be obtained by observing actual memory accesses by the program sections identified as methods 28 during execution of those program sections. The read set 38 is stored in the execution buffer 24 and a pointer to the read set 38 enrolled in the logical table 71.

Referring to FIG. 6, each of the methods 28 defined for example by a range of program counter values, may be enrolled in a logical table 71 that may be held all or in part in registers 22 of parallelization circuitry 20 and/or memory 16, the range of program counter values indicating a starting and stopping point of the method. The call points, again expressed as program counter values, may also be enrolled in the table 71. In general, there may be multiple call points for a given method 28 and each call point may be associated with unique trigger points, handlers 36, read sets 38 and write sets 46.

At process block 74, the trigger points for each method 28 are identified. This is a substantially more complicated problem as will be discussed below. Generally there will not be a clear pre-defined instruction pattern indicating the appropriate trigger point. It is desirable that the trigger point occur when the read set 38 for the method 28 has been resolved and that the trigger point be soon enough in the program 18 that the method 28 and handler 36 may be fully executed before the corresponding call point, but neither of these conditions is required. As discussed above, the execution of the method 28 may be on-going on the second processor unit 12 when the first processor unit 12 arrives at the call point, and unresolved values of the read set, may in one embodiment, be predicted values for some or all of the read set. The prediction may be based on historical values or simple prediction rules, of a type known in the art.

At process block 76, preparatory instructions 34 between the trigger point and calling point, defined in light of the read set 38, are then collected as handlers 26 in memory 16. A pointer to these handlers 26 is enrolled in the logical table to allow the proper handler to be invoked by the firmware 39. To some extent, the preparatory instructions 34 could include all prior instructions in the program 18; however, it is only necessary to collect those instructions after the trigger point, as instructions earlier than the trigger point will have been resolved in the execution of the program 18 itself, and thus are not speculative.

At optional process block 78, the program 18 may be executed and its performance monitored, and based on this monitoring, adjustments may be made to the trigger points, either moving them ahead or back, or eliminating some trigger points so as not to speculatively execute given methods 28 at all. In this way, the locations of the trigger points may be dynamically adjusted, as indicated by process block 80.

Figure 7:
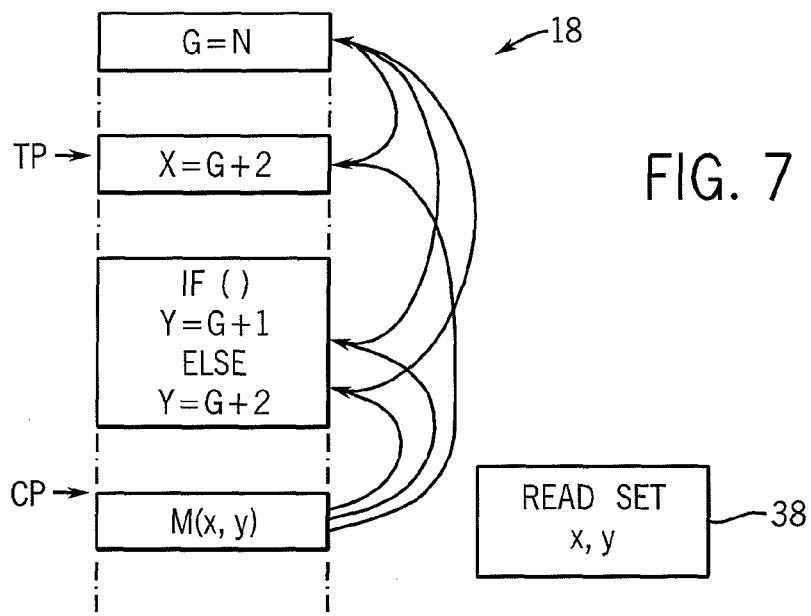
FIG. 7 is a figure similar to that of FIG. 2 showing example instructions used in the process of identifying trigger points per FIG. 5.

Referring now to FIG. 7, in one technique of identifying the trigger points, the parameters of the read set 38 are used to evaluate the instructions before the method 28 in the control flow order 32 from the call point backwards in a backtracking operation. Any instruction necessary for developing the input parameter values is marked as a preparatory instruction. This backtracking process is continued until the first point at which the heap is accessed for the development of a read set value; that is, variables outside of the stack or local registers. At this occurrence, the trigger point may be placed at the next (in control flow order 32) preparatory instruction. The trigger point may also be placed earlier if the read set for the method and handler is resolved earlier. This technique reflects generally the fact that the heap is accessible by many methods 28, and thus the potential of data conflicts is increases at this point. Nevertheless, this is simply one technique for locating the trigger points and may be modified or replaced with other such techniques.

Figure 8:
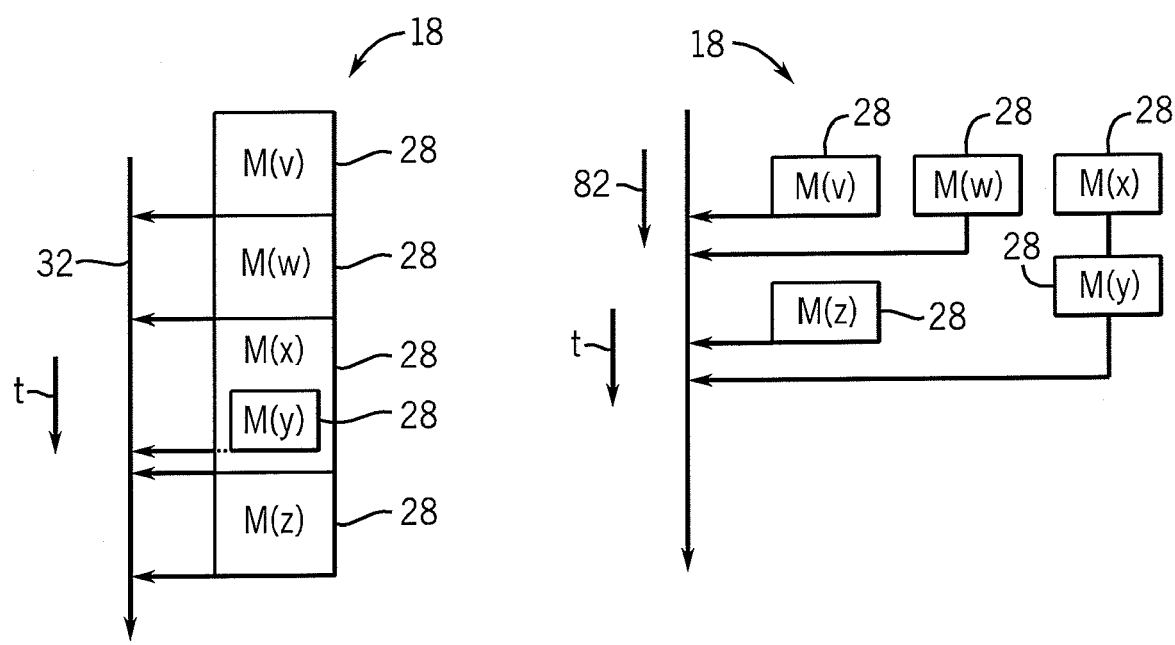
FIG. 8 is a representation of the operation of the present invention in demultiplexing methods to execute in parallel.

Referring now to FIG. 8, the sequential program 18 will have a normal control flow defining an order of execution of multiple methods 28 labeled M(V) to M(Z). Each of these methods 28 will be executed in sequence according to the control flow order 32. In the present invention, the methods 28 are effectively de-multiplexed to be executed in parallel according to an implicit data flow 82 allowing them to be executed in a shorter span of time.

Empirical work done by the present inventors suggests that the parallelization of methods can speed up standard test programs as much as two times.

It will be recognized that the present invention can also be applied to multiprocessor architectures where the processors are not necessarily on one integrated circuit. Further it will be understood that the functions of the present invention can be variously executed in software or hardware and that the allocation of storage among different memory and register types may be freely varied, as will be understood to those of ordinary skill in the art reviewing this disclosure.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of parallelizing execution of a computer program comprising the steps of:

(a) executing the program on a first processor, the program having at least one program method;

(b) at a trigger point in the program as executed on the first processor and before a point of calling of the program method as executed on the first processor, executing the program method on a second processor based on assumed values of a read set of data read by the program method in the program method's execution; and (c) at the point of calling the program method as executed on the first processor;

(i) if there has been no writing to the read set since the trigger point, not executing the program method on the first processor and instead adopting a write set of data written by the given program method during execution of the program method on the second processor;

(ii) if there has been a writing to the read set since the trigger point executing the program method on the first processor.

2. The method of claim 1 wherein program method is a programmer-defined portion of a program communicating with other program portions through a stack-type memory structure.

3. The method of claim 1 wherein the program method is a programmer-defined portion of a program called at one or more locations in the program and having a distinctive entry and exit defining a scope of local variables used by the program method.

4. The method of claim 1 wherein program methods are functions selected from the group consisting of system libraries, application libraries, and class objects.

5. The method of claim 1 wherein step (c)(i) also adopts the write set if there has been a writing to the read set but no change of values of the read set; and wherein step (c)(ii) executes the program method on the first processor only if the writing to the read set changed a value of the read set.

6. The method of claim 1 including the step of repeating steps (b) and (c) for additional program methods of the program using additional processors.

7. The method of claim 1 wherein the writing to the read set of step (c) is by the first processor.

8. The method of claim 1 wherein the writing to the read set of step (c) is by a third processor.

9. The method of claim 1 wherein a location of the trigger point in the program is selected so that the program method is completely executed by the second processor before the first processor completes execution of the program method.

10. The method of claim 1 including the step of detecting the trigger point by monitoring a program counter of the first processor against a stored value.

11. The method of claim 1 wherein the trigger point is detected by placing a triggering instruction in the first program at the trigger point.

12. The method of claim 1 wherein the trigger point is detected by monitoring a memory access address.

13. The method of claim 1 including the step of repeating steps (a)-(c) to measure performance of the program and changing the trigger point in response to that measurement.

14. The method of claim 13 wherein changing the trigger point moves a location of the trigger point.

15. The method of claim 13 wherein changing the trigger point removes the trigger point.

16. The method of claim 1 including the steps of:
identifying locations of the program methods in the program; and
executing the program while monitoring memory accesses during program method execution to determine the read set for the program method.

17. The method of claim 1 wherein the program methods are identified by call instructions associated with program methods.

18. The method of claim 1 wherein the trigger points are determined by an availability of the read sets of the program methods.

19. The method of claim 1 wherein the assumed values of the read set are predicted values.

20. The method of claim 1 further including the step of performing instruction level speculative execution or other speculative optimizations.

21. A computer system parallelizing execution of a computer program comprising:
multiple intercommunicating processors;
a parallelization unit communicating with the processors and operating to:
(a) execute the program on a first processor, the program having at least one program method;
(b) at a trigger point in the program as executed on the first processor and before a point of calling of the program method as executed on the first processor, execute the program method on a second processor based on assumed values of a read set of data read by the program method in the program method's execution; and
(c) at the point of calling the program method as executed on the first processor;
(i) if there has been no writing to the read set since the trigger point, not executing the program method on the first processor and instead adopting a write set of data written by the given program method during execution of the program method on the second processor;
(ii) if there has been a writing to the read set since the trigger point executing the program method on the first processor.

* * * * *